United States Patent
Kim et al.

(10) Patent No.: US 10,305,643 B2
(45) Date of Patent: May 28, 2019

(54) WIRELESS PREAMBLE STRUCTURE FOR OFDMA SIGNALING UNDER OBSS INTERFERENCE

(71) Applicant: Apple Inc., Cupertino, CA (US)

(72) Inventors: Joonsuk Kim, Saratoga, CA (US); Guoqing Li, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 154 days.

(21) Appl. No.: 15/192,065

(22) Filed: Jun. 24, 2016

(65) Prior Publication Data

US 2016/0380731 A1 Dec. 29, 2016

Related U.S. Application Data

(60) Provisional application No. 62/183,973, filed on Jun. 24, 2015.

(51) Int. Cl.
| | |
|---|---|
| *H04L 5/00* | (2006.01) |
| *H04L 1/00* | (2006.01) |
| *H04W 28/20* | (2009.01) |
| *H04W 4/08* | (2009.01) |
| *H04W 88/02* | (2009.01) |
| *H04W 88/08* | (2009.01) |
| *H04W 80/00* | (2009.01) |

(52) U.S. Cl.
CPC .......... *H04L 5/0007* (2013.01); *H04L 1/0003* (2013.01); *H04L 5/0053* (2013.01); *H04L 5/0094* (2013.01); *H04W 4/08* (2013.01); *H04W 28/20* (2013.01); *H04W 80/00* (2013.01); *H04W 88/02* (2013.01); *H04W 88/08* (2013.01)

(58) Field of Classification Search
CPC ... H04L 1/0003; H04L 5/0007; H04L 5/0053; H04L 5/0094; H04W 28/20; H04W 4/08; H04W 80/00; H04W 88/02; H04W 88/08
See application file for complete search history.

(56) References Cited

U.S. PATENT DOCUMENTS

| | | | |
|---|---|---|---|
| 7,801,180 | B2 | 9/2010 | Cai et al. |
| 2013/0286959 | A1 | 10/2013 | Lou et al. |
| 2015/0163028 | A1 | 6/2015 | Tandra et al. |
| 2016/0242177 | A1* | 8/2016 | Seok ................. H04W 72/0446 |
| 2017/0171861 | A1* | 6/2017 | Seok ................. H04W 74/0816 |
| 2017/0331587 | A1* | 11/2017 | Kim ...................... H04L 1/0045 |

* cited by examiner

*Primary Examiner* — Awet Haile
(74) *Attorney, Agent, or Firm* — Meyertons Hood Kivlin Kowert & Goetzel, P.C.; Jeffrey C. Hood

(57) ABSTRACT

A wireless access point transmits a protocol data unit (PDU) that includes data and signaling for a plurality of user devices. The PDU spans a channel in frequency and an interval in time, and includes a first signaling section, a second signaling section and a traffic action. For each of a plurality of subchannels of the channel: the first signaling section includes (within the subchannel) a corresponding redundant copy of common signaling information for the user devices associated with the access point; the second signaling section includes (within the subchannel) a corresponding set of user-specific signaling information for a corresponding group of one or more of the user devices; and the traffic section includes (within the subchannel) a corresponding set of traffic data for the corresponding group of one or more user devices. Subchannels sizes may be configurable. A signaling set CRC may be included per subchannel.

20 Claims, 11 Drawing Sheets

WIRELESS PREAMBLE STRUCTURE FOR OFDMA SIGNALING UNDER OBSS INTERFERENCE

PRIORITY CLAIM INFORMATION

This application claims the benefit of priority to U.S. Provisional Application No. 62/183,973, filed on Jun. 24, 2015, by Joonsuk Kim and Guoqing Li, titled "Wireless Signal Field Structure for OFDMA Signaling under OBSS Interference". That Provisional Application is hereby incorporated by reference in its entirety as though fully and completely set forth herein.

FIELD OF THE INVENTION

The present disclosure relates to the field of wireless communication, and more particularly, to the mechanisms for organizing signaling fields in a protocol data unit for OFDMA (Orthogonal Frequency-Division Multiple Access) in wireless networks.

DESCRIPTION OF THE RELATED ART

A wireless access point transmits a Physical Protocol Data Unit (PPDU) that spans a frequency channel and an interval in time. In downlink multiuser mode, different user devices are allocated different resources within the PPDU. IEEE 802.11ax, the next generation of the IEEE 802.11 standard, is planned to have a downlink multiuser mode in which Orthogonal Frequency Division Multiple Access (OFDMA) is used to transmit downlink data to a plurality of user devices. In the 802.11ax standardization community, there is agreement that the PPDU (or more precisely, the preamble of the PPDU) should include an HE SIG-B section to provide signaling for the downlink multiuser mode. The prefix HE is an acronym for High Efficiency. SIG is meant to suggest "signaling". The letter B is to distinguish HE SIG-B from HE SIG-A, which is intended to support signaling for a single user mode. However, the content of the HE SIG-A and HE SIG-B sections have not been defined by the standardization community. Thus, it remains an open question how to best configure the HE SIG-A and HE SIG-B sections when transmitting PPDUs in downlink multiuser mode, especially when one or more subchannels of the channel experience interference due to overlapping basic service sets (OBSSs), i.e., basic service sets that interfere with the basic service set of the present access point.

SUMMARY

In one set of embodiments, a wireless access point may transmit a protocol data unit (PDU) that spans a frequency channel and an interval in time. The PDU may include a first signaling section and a second signaling section. The first signaling section may span the frequency channel and a first interval in time. The second signaling section may span the frequency channel and a second interval in time. The frequency channel may include a plurality of subchannels. For each of the subchannels, the first signaling section may include a corresponding field that spans the subchannel and the first time interval. Similarly, for each of the subchannels, the second signaling section may include a corresponding field that spans the subchannel and the second time interval. The fields of the first signaling section may include respective copies (i.e., redundant copies) of a common signaling information set which is intended for all users associated with the access point. In contrast, the fields of the second signaling section may include respectively different signaling information sets for different groups of user devices. In particular, for each subchannel, the corresponding field of the second signaling section may include signaling information intended for a corresponding group of one or more user devices that have been allocated to that subchannel. A given field of the second signaling section may include signaling subfields for the respective user devices of the corresponding user device group. A signaling subfield may include signaling information such as modulation-and-coding scheme (MCS), number of spatial streams, beamforming information, etc. for the corresponding user device. Thus, the second signaling section may be useful for supporting downlink multiuser operation.

The PDU may also include a traffic section than spans the frequency channel and a third interval time (which is not necessarily adjacent to the second time interval). For each of the subchannels, the traffic section may include a corresponding field that spans the frequency channel and the third time interval. Each field of the traffic channel may include user traffic data for the corresponding group of one or more user devices. For a given subchannel, the corresponding field of the second signaling section may include allocation information that identifies a partitioning of the resource units in the corresponding field of the traffic section, i.e., a partitioning among the one or more user devices of the corresponding group.

In some embodiments, for each subchannel, the corresponding field of the second signaling section includes only signaling information relating to user data transmissions on the corresponding subchannel. In other words, there is no subchannel-to-subchannel crossover of the signaling provided in the second signaling section. Thus, the corruption of one subchannel due to interference from an overlapping basic service set (OBSS) will not compromise OFDMA performance on other subchannels of the PDU.

In some embodiments, each field of the second signaling section may be appended with a corresponding Cyclic Redundancy Check (CRC) value, enabling the field to be checked independently of the others fields. A given user device may be assigned by the access point to only one of the subchannels, and thus, may not be interested in decoding all the fields of the second signaling section. Indeed, with respect to the second signaling section, a user device may selectively decode only the field corresponding to its assigned subchannel. Similarly, with respect to the traffic section, the user device may selectively decode only the allocated portion(s) of the traffic field corresponding to its assigned subchannel.

In some embodiments, the size of the subchannels is configurable, with each subchannel having a bandwidth equal to a positive integer multiple of a unit bandwidth. Different subchannels may correspond to different integer multiples. The access point may generate a PDU using subchannels having any combination of bandwidths, subject to the constraint that the sum of the subchannel bandwidths equals the total bandwidth of the channel. The subchannel configuration may be signaling to the user devices, e.g., as part of the information provided in the first signaling section.

It should be noted that IEEE 802.11ax is a next generation of the IEEE 802.11 standard, i.e., a generation that is still under development. There is agreement in the 802.11ax standardization community that, in the context of multiuser downlink mode a physical protocol data unit (PPDU) should include an HE SIG-B section in addition to an HE SIG-A section. However, the content of the HE SIG-A and HE SIG-B sections have not been defined by said community. The PPDU structures described herein give definitions to those sections, i.e., definitions that provide technical advantages for the realization of downlink multiuser operation.

BRIEF DESCRIPTION OF THE DRAWINGS

A better understanding of the present subject matter can be obtained when the following detailed description of the preferred embodiment is considered in conjunction with the following drawings.

Figure 1:
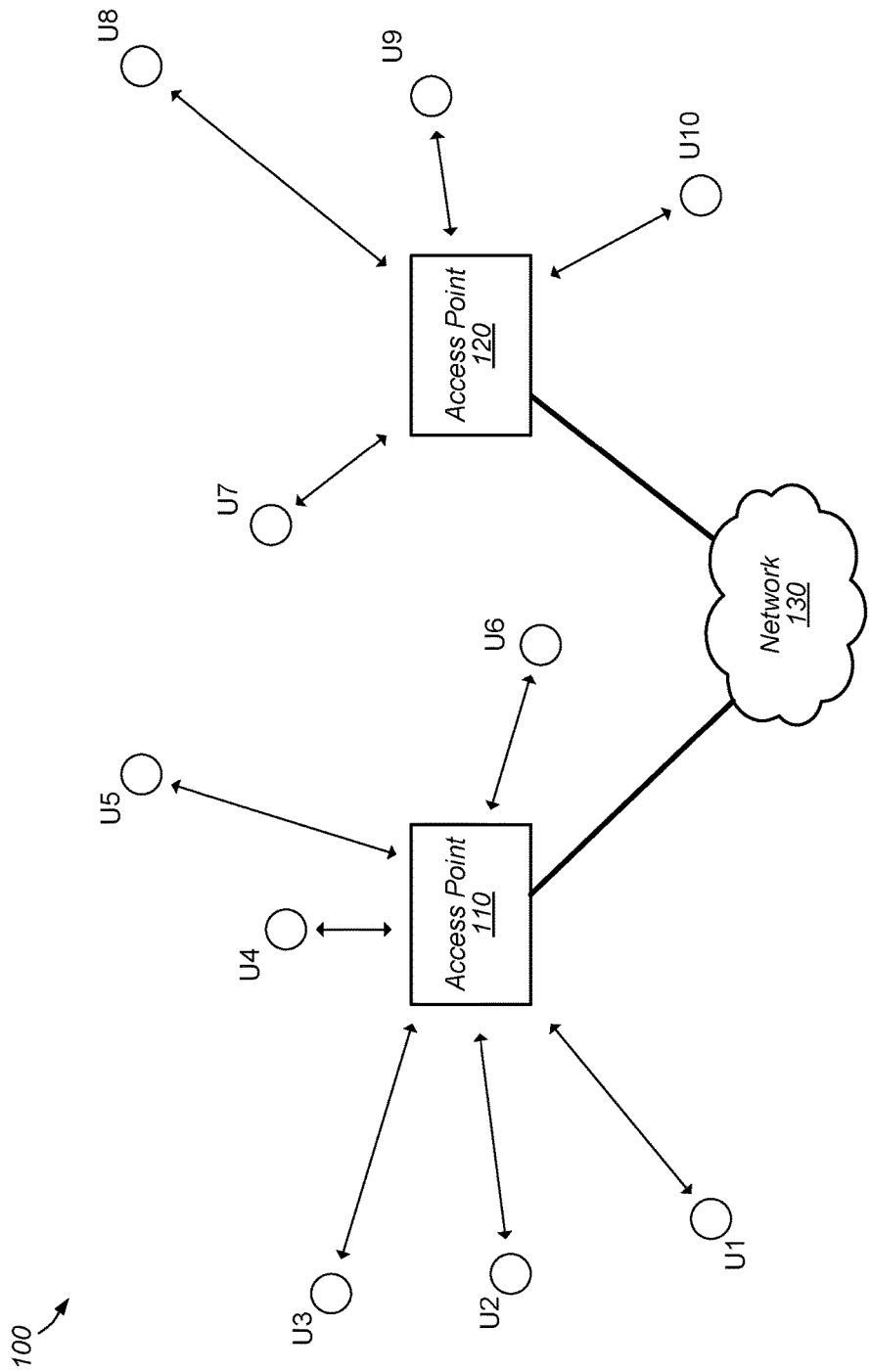
FIG. 1 illustrates an example of a wireless communication network according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terminology

The following is a glossary of terms used in the present disclosure:

Memory Medium—a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; media based on the modulation of a physical property of a material substrate; etc. The term "memory medium" includes within its scope of meaning the possibility that a given memory medium might be a union of two or more memory media that reside at different locations, e.g., in different portions of an integrated circuit or on different integrated circuits in an electronic system or on different computers in a computer network.

Carrier Medium—a memory medium as described above, as well as a physical transmission medium, such as a bus, network, and/or other physical transmission medium that conveys signals such as electrical, electromagnetic, or digital signals.

Programmable Hardware Element—a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

Computer System—any of various types of computing or processing systems, including a personal computer system (PC), mainframe computer system, workstation, network appliance, Internet appliance, personal digital assistant (PDA), personal communication device, smart phone, wearable device, television system, grid computing system, or other device or combinations of devices. In general, the term "computer system" can be broadly defined to encompass any device (or combination of devices) having at least one processor that executes instructions from a memory medium.

User Device—any of various types of computer-containing devices which perform wireless communication. User devices may include mobile devices or non-mobile devices. Examples include mobile phones or smart phones (e.g., iPhone™ Android™-based phones), wearable devices (e.g., smart watch, smart glasses), personal digital assistants, portable gaming devices (e.g., Nintendo DS™, PlayStation Portable™ Gameboy Advance™, iPhone™), portable Internet devices, music players or media players, desktop computers, laptop computers, data storage devices, handheld devices, devices implanted in living organisms, etc.

Base Station or Access Point (AP)—The term "Base Station" has the full breadth of its ordinary meaning, and at least includes a wireless communication station installed at a fixed location and used to communicate as part of a wireless network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

FIG. 1—Embodiment of Communication Network

FIG. 1 illustrates an example of a wireless communication network 100, according to one set of embodiments. The wireless communication network 100 includes access points such as access point 110 and access point 120. Each of the access points is configured to wirelessly communicate with user devices (e.g., mobile devices and/or stationary devices). For example, access point 110 is shown in wireless communication with user devices U1-U6 while access point 120 is shown in wireless communication with user devices U7-U10. (The specific numbers of access points and user devices shown in FIG. 1 are not meant to be limiting.) Furthermore, each of the access points may be coupled to a network 130 such as the Internet or other interconnected network of computerized devices. An access point may couple to the network 130 via a wired connection (and/or via a wireless connection).

In some situations, two or more of the access points may interfere with one another. For example, the communication channels on which the access points operate may overlap. Thus, there exists a need for mechanisms capable of increasing communication performance in the presence of such interference. In some embodiments, an access point such as access point 110 (or access point 120) may generate and transmit a wireless protocol data unit (PDU) that spans a channel in frequency and an interval in time. The wireless PDU may include a first signaling section, a second signaling section and a traffic section. For each of a plurality of subchannels of the channel, the first signaling section may include within that subchannel a redundant copy of first common signaling information for user devices such as user devices U1-U6. Furthermore, for each of the plurality of subchannels of the channel, the second signaling section may include within that subchannel a corresponding set of signaling information for a corresponding group of the user devices.

Figure 2:
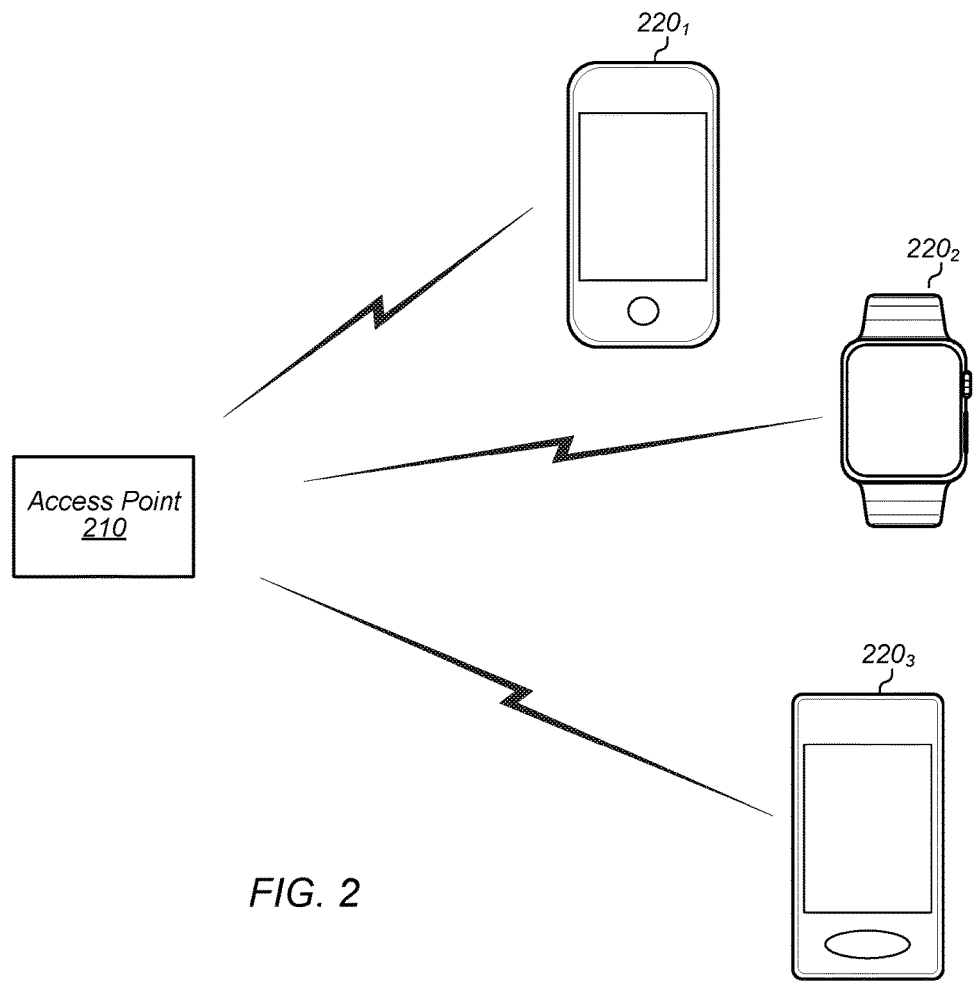
FIG. 2 illustrates an example of an access point in communication with a plurality of user devices, according to some embodiments.

FIG. 2—Embodiment of Access Point

The access points of the wireless communication network 100 may be realized by access points such as access point 210 shown in FIG. 2. (While FIG. 2 shows a specific example of the access point 210 in communication with user devices 2201, 2202 and 2203, the number of user devices shown is not meant to be limiting. Indeed, the access point 210 may operate with any number of user devices subject to basic constraints such as operating bandwidth, subcarrier spacing, sampling rate, etc. In some embodiments, the access point may be configured to generate and transmit a wireless protocol data unit (PDU) including a first signaling section, a second signaling section and a traffic section, e.g., as described above in connection with FIG. 1.

In some embodiments, the access point 210 may include baseband processing circuitry and a radio transceiver. The baseband processing circuitry may be realized by one or more processors (or processor cores) configured to execute stored program instructions, by one or more dedicated digital circuits such as ASICs (or portions of ASICs), by one or more programmable hardware elements such as FPGAs (or portions of FPGAs), or by any combination of the foregoing. The radio transceiver may be configured to:

receive baseband downlink signal(s) from the baseband processing circuitry, convert the baseband downlink signal(s) to RF downlink signal(s), and transmit the RF downlink signal(s) onto a wireless medium via one or more antennas; and receive RF uplink signal(s) from the wireless medium via the one or more antennas, convert the RF uplink signal(s) to baseband uplink signal(s), and provide the baseband uplink signal(s) to the baseband processing circuitry.

The radio transceiver may include a plurality of transmit chains (e.g., one transmit channel per antenna) and a plurality of receive channels (e.g., one receive chain per antenna).

In some embodiments, the access point 210 may be configured to transmit a downlink OFDMA signal to user devices. (OFDMA is an acronym for Orthogonal Frequency Division Multiple Access.) The user devices may be configured to receive the downlink OFDMA signal (or respective portions of the downlink OFDMA signal) from the access point.

In some embodiments, the access point 210 may be configured to perform downlink spatial multiplexing to the user devices, in which case the access point includes a plurality of antennas. Downlink spatial multiplexing refers to the ability to transmit two or more spatial streams to a user device, wherein the two or more spatial streams are superposed on the same set of time-frequency resources. A user device configured for downlink spatial multiplexing will likewise include a plurality of antennas.

The access point 210 may be configured to perform improved wireless communication according to any subset of the features, elements and embodiments described in this patent. Similarly, a user device may be configured to perform improved wireless communication according to any subset of the features, elements and embodiments described in this patent.

In some embodiments, the user devices may include wireless devices such as desktop computers, laptop computers, mobile phones, hand-held devices, wearable devices, tablets, media players, devices implanted in living organisms, devices embedded in sensors and/or actuators, etc.

In some embodiments, the access point 210 and one or more of the user devices may be configured with Wi-Fi communication capability.

In some embodiments, the access point 210 may be configured as a wireless router.

In some embodiments, the access point 210 and one or more of the user devices may be configured to communicate using one or more wireless communication standards such as WiFi (IEEE 802.11), GSM, UMTS, LTE, LTE-Advanced (LTE-A), 3GPP2 CDMA2000, Bluetooth, etc. One or more of the user devices may also or alternatively be configured to receive according to one or more mobile television broadcasting standards (e.g., ATSC-M/H or DVB-H), and/or any other wireless communication standard, as desired.

In some embodiments, a user device may include baseband processing circuitry and a radio transceiver. The baseband processing circuitry may be realized by one or more processors (or processor cores) configured to execute stored program instructions, by one or more dedicated digital circuits such as ASICs (or portions of ASICs), by one or more programmable hardware elements such as FPGAs (or portions of FPGAs), or by any combination of the foregoing. The radio transceiver may be configured to:

receive baseband uplink signal(s) from the baseband processing circuitry, convert the baseband uplink signal(s) to RF uplink signal(s), and transmit the RF uplink signal(s) onto a wireless medium via one or more antennas; and receive RF downlink signal(s) from the wireless medium via the one or more antennas, convert the RF downlink signal(s) to baseband downlink signal(s), and provide the baseband downlink signal(s) to the baseband processing circuitry.

The radio transceiver may include a plurality of transmit chains (e.g., one transmit channel per antenna) and a plurality of receive channels (e.g., one receive chain per antenna).

Figure 3:
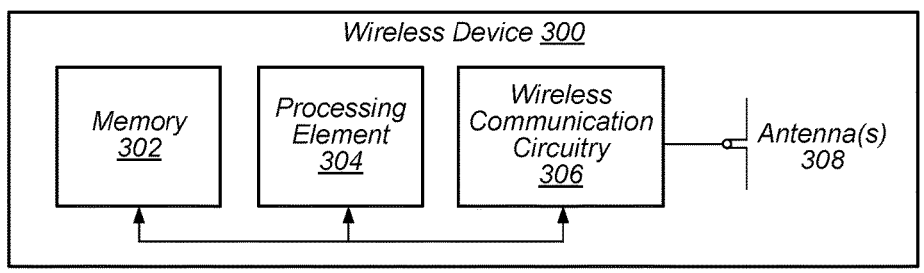
FIG. 3 illustrates an example of a wireless communication device according to some embodiments.

FIG. 3—Embodiment of Wireless Device 300

FIG. 3 illustrates a wireless device 300 that may be configured for use in conjunction with various aspects of the present disclosure, according to some embodiments. The device 300 may be any of a variety of types of device and may be configured to perform any of a variety of types of functionality. For example, the device 300 may be a substantially portable device (e.g., a mobile device), such as a mobile phone, a personal productivity device, a computer or a tablet, a wearable device, a handheld gaming console, a portable media player, etc. Alternatively, the device 300 may be a substantially stationary device, such as a wireless access point, or other device such as a television, a speaker or other audio rendering device, a set-top box, etc., as desired.

As shown, the device 300 may include a processing element 304. The processing element 304 may include or be coupled to one or more local and/or system memory elements, such as memory 302. In some embodiments, the processing element 304 may be configured to generate and transmit a wireless protocol data unit (PDU) including a first signaling section, a second signaling section and a traffic section, e.g., as described above and/or as described below in connection with any of FIGS. 4-12.

Memory 302 may include any of a variety of types of memory and may serve any of a variety of functions. For example, memory 302 could be RAM serving as a system memory for processing element 304. Other types of memory and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), and digital processing circuitry (e.g., for digital modulation as well as other digital processing). Similarly, the radio may implement one or more receive and transmit chains using the aforementioned hardware. For example, the wireless device 300 may share one or more parts of a receive chain and/or a transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing and utilizing any of the preamble structures disclosed herein.

In legacy 802.11-based systems, there is the concept of primary channel and secondary channel. An access point may be assigned a primary channel and a secondary channel adjacent to the primary channel. If the access point senses that both the primary channel and the secondary channel are clear (not presently being used), the access point may transmit a downlink protocol data unit on an expanded channel equal to the union of the primary channel and the secondary channel. (The access point may signal the expanded bandwidth to user devices by a bandwidth indication in the SIG field of the primary channel. By reading the bandwidth indication, a user device can expand its operating bandwidth to the indicated bandwidth.) If the access point senses that the primary channel is clear but the secondary channel is not, the access point may transmit a downlink protocol data unit on the primary channel.

Different access points may have the same or different primary channels. Furthermore, different access points may have primary channels of the same or different bandwidths. Thus, the downlink transmissions of access points may interfere with one another as those transmissions may overlap in the frequency domain.

In the context of OFDMA, which is planned for IEEE 802.11ax, there is still a need to protect medium access from interference by other access points. Thus, in at least some embodiments, we propose that the PDU preamble occupy the entire operating bandwidth of the access point, regardless of the primary channel. (All fields of the legacy preamble may be duplicated over the operating bandwidth. The HE SIG-A field may also need to be duplicated over the operating bandwidth since the receiver will not have decoded the bandwidth indication before it decodes HE SIG-A.) By duplicating fields in the preamble, the information carried in those fields may be more reliably decoded. For example, with an 80 MHz channel, the receiver may experience a 6 dB gain in signal-to-noise ratio by averaging over the multiple redundant copies. Since HE SIG-A includes a number of important control signaling elements, it benefits especially from the use of duplication.

New Structure for Protocol Data Unit

Figure 4:
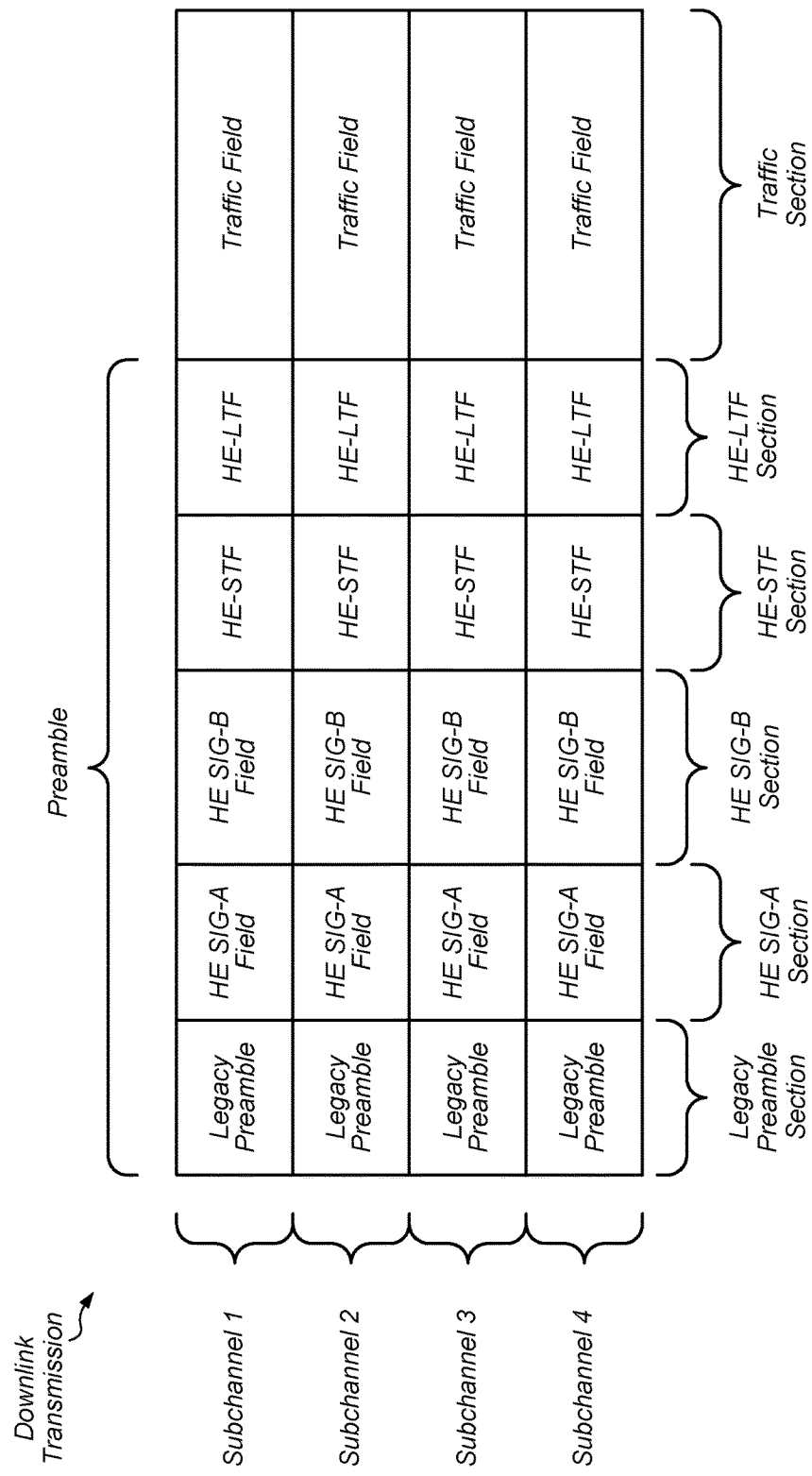
FIG. 4 illustrates an example of a downlink protocol data unit (PDU) according to some embodiments.

In one set of embodiments, an access point may transmit a protocol data unit (PDU) having the structure shown in FIG. 4. The protocol data unit may span a channel having a specified bandwidth, e.g., a bandwidth of 80 MHz (or some other bandwidth such as 40 MHz, 160 MHz, 80+80 MHz, etc.) The channel may include four (or some other number of) subchannels. Each subchannel may be 20 MHz in width (or some other width). The protocol data unit may include a preamble as well as a traffic (i.e., user data) section. The preamble may include:

a legacy preamble section;
an HE SIG-A section;
an HE SIG-B section;
an HE-STF (High Efficiency—Short Training Field) section; and
an HE-LTF (High Efficiency—Long Training Field) section.

In other embodiments, the preamble may exclude one or more of these sections, and/or include additional sections.

Each of the sections may span the channel bandwidth and a corresponding interval in time.

A section may be configured to have redundant copies of an information set, with each subchannel portion of the section containing one of the copies. Such inclusion of redundant copies in a section enables a user device to experience a gain in effective signal to noise ratio by averaging over the copies. In some embodiments, two or more of the sections may configured with such redundancy. (1) For example, the legacy preamble section may include four copies of a legacy preamble, i.e., one copy for each of the four subchannel portions of the legacy preamble section. (The term "legacy preamble" means the preamble as defined in any existing 802.11 standard.) The legacy preamble allows legacy devices to operate in the network. (2) As another example, the HE SIG-A section may include four copies of an HE SIG-A information set, i.e., one copy for each of the four subchannel portions of the HE SIG-A section. (3) As yet another example, the HE-STF section may include four copies of an HE-STF information set, i.e., one copy for each of the four subchannel portions of the HE-STF section. (4) As yet another example, the HE-LTF section may include four copies of an HE-LTF information set, i.e., one copy for each of the four subchannel portions of the HE-LTF section.

In contrast, the HE SIG-B section may depart from the redundancy configuration of the above described sections. The HE SIG-B section may include four HE SIG-B fields, with each of the fields spanning a corresponding one of the subchannels. Each HE SIG-B field may include signaling information (e.g., downlink multiuser signaling information) for a corresponding set of one or more user devices. (The set of one or more user devices is also referred to herein as a "group".) Thus, the HE SIG-B fields generally include respectively different signaling information for the different user device sets, not redundant copies of a base information set.

A user device that has been assigned to a given subchannel may selectively decode only the corresponding HE SIG-B field. In some embodiments, at least for the duration of the HE SIG-B section, the user device may tune its receiver so its reception band corresponds to the band of the assigned subchannel.

The traffic section may include four traffic fields corresponding respectively to the four respective sets of user devices. Each traffic field includes user traffic data for the one or more user devices of the corresponding user device set. Different portions of the traffic field may be assigned to different ones of the user devices. A given user device may selectively decode only its assigned portion(s) of the assigned traffic field, i.e., the traffic field to which the user device has been assigned. The user device may ignore the traffic fields to which it has not been assigned.

A given user device may be assigned to one of the subchannels (and thus, to the corresponding user device set) based on a scheduling algorithm that takes into consideration parameters such as:

for each user device in a scheduling pool, signal-to-noise (or throughput) conditions per subchannel;
for each user device in the scheduling pool, time interval since last allocation;
for each user device in the scheduling pool, quality-of-service level associated with the user device.

Figure 5:
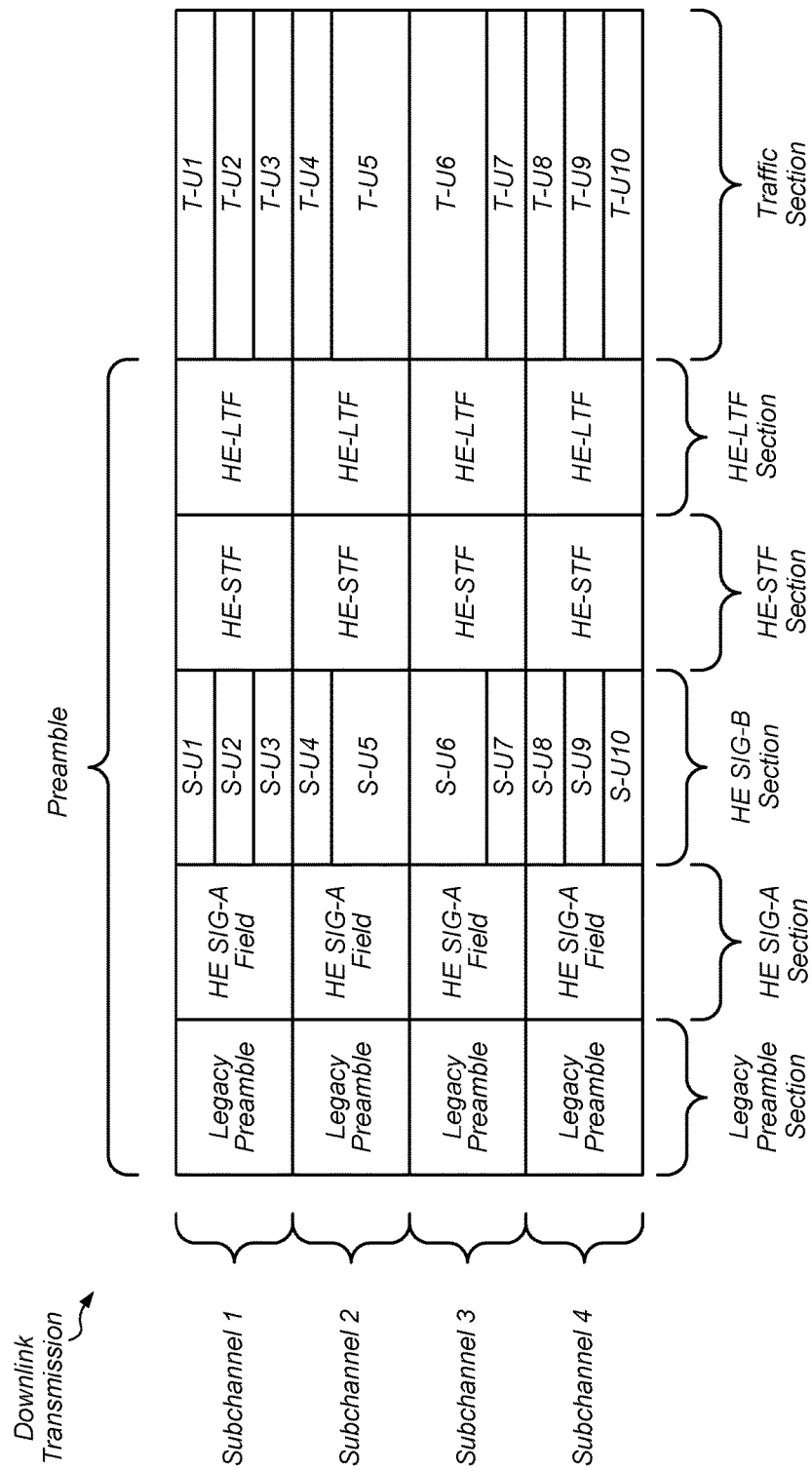
FIG. 5 illustrates an example of a protocol data unit according to some embodiments, where the protocol data unit includes signaling information and user data for different subchannel-specific groups of user devices.

FIG. 5 shows an example of the HE SIG-B section and the traffic section, according to one embodiment.

A first HE SIG-B field, corresponding to subchannel 1, includes three subfields.

The three subfields contain signaling information S-U1, S-U2 and S-U3 for user devices U1, U2 and U3, respectively.

A second HE SIG-B field, corresponding to subchannel 2, includes two subfields.

The two subfields contain signaling information S-U4 and S-U5 for user devices U4 and U5, respectively.

A third HE SIG-B field, corresponding to subchannel 3, includes two subfields.

The two subfields contain signaling information S-U6 and S-U7 for user device U6 and U7, respectively.

A fourth HE SIG-B field, corresponding to subchannel 4, includes three subfields.

The three subfields contain signaling information S-U8, S-U9 and S-U10 for users U8, U9 and U10, respectively.

In some embodiments, each user-specific signaling subfield S-Uk may occupy the same interval of frequency as the corresponding traffic subfield T-Uk. However, in alternative embodiments, the traffic subfield T-Uk does not necessarily occupy the same frequency interval as the user-specific signaling subfield S-Uk.

In some embodiments, the group of users for one subchannel is disjoint from the group of users for another subchannel. However, in alternative embodiments, different user groups are not necessarily disjoint.

Continuing with the example of FIG. 5, the fields of the traffic section may be similarly partitioned.

A first traffic field, corresponding to subchannel 1, includes three subfields. The three subfields contain traffic information T-U1, T-U2 and T-U3 for user devices U1, U2 and U3, respectively.

A second traffic field, corresponding to subchannel 2, includes two subfields.

The two subfields contain traffic information T-U4 and T-U5 for user devices U4 and U5, respectively.

A third traffic field, corresponding to subchannel 3, includes two subfields. The two subfields contain traffic information T-U6 and T-U7 for user devices U6 and U7, respectively.

A fourth traffic field, corresponding to subchannel 4, includes three subfields.

The three subfields contain traffic information T-U8, T-U9 and T-U10 for user devices U8, U9 and U10, respectively.

FIG. 5 suggests that the traffic information subfields {T-Uk: k=1, ..., $K_{max}$} have the same temporal width, and thus, are defined by their corresponding intervals in frequency. However, in other embodiments, the traffic information fields may have different structure or more complex structure. (For example, the traffic information subfields within a given subchannel may be assigned rectangular regions within the corresponding traffic field, where the rectangular regions partition the time-frequency resources in that traffic field.)

The signaling information S-Uk for generic user device Uk may include information such as:
an indicator of the modulation-and-coding scheme (MCS) used by the access point to generate the traffic information T-Uk for user device Uk; and
the number of spatial streams (Nsts) allocated to the user device Uk for downlink spatial multiplexing.

Each user device may receive one or more spatial streams, depending on its capabilities, e.g., number of antennas. (The number of spatial streams transmitted to a given user device cannot exceed the number of antennas of that user device.) For example, an access point with eight antennas might transmit:
four parallel spatial streams to a first user device having four antennas;
two parallel spatial streams to a second user device having two antennas;
two parallel spatial streams to a third user device having two antennas; and
one spatial stream to a fourth user device having only one antenna.

Thus, the generic traffic data portion T-Uk for a user device Uk may include the superposition of Nsts spatial streams.

As discussed above, the HE SIG-A section of the protocol data unit includes an HE SIG-A information set that is duplicated over the operating bandwidth. (Each of the four HE SIG-A fields includes a copy of the HE SIG-A information set.) During the HE SIG-A section (and/or during the legacy preamble section), the user device may tune its receiver to receive over the entire channel bandwidth in order to receive and decode the HE SIG-A information set (and/or the legacy preamble), relying on the multiple copies of that information set to improve decoding accuracy. Recall that the HE SIG-A field include multiple HE SIG-A field, each of which includes a corresponding copy of the HE SIG-A information set.

In some embodiments, the HE SIG-A section may span two OFDM symbols. In one of those embodiments, the HE SIG-A information set has approximately 48 to 52 information bits. Thus, it may not be necessary to utilize duplication of information bits across fields in the HE SIG-B section. Therefore, we may assume that the fields of the HE SIG-B section are not the same.

The HE SIG-B section may be used to support downlink multiuser operation. Multiuser (MU) mode is typically used for higher throughput transmission to users. Thus, in the context of MU mode, it is typically not necessary to provide for noise reduction by duplication of information. Since HE SIG-B will typically need to carry a substantial volume of control information for MU-OFDMA, it may be advisable to not duplicate the control information across fields in the HE SIG-B section.

Groupwise Common Information and User Specific Information in HE SIG-B

As noted above, each of the fields of the HE SIG-B section provides signaling for a corresponding group of one or more user devices. In some situations, there may be common signaling information that needs to decoded by all the user devices in a group. For example, information that indicates an allocation of Resource Units (RUs) in the traffic field may need to be decoded by all user devices in a group. However, such common signaling information is typically not meaningful for other groups. Thus, each HE SIG-B field may include common signaling information for the corresponding group of one or more user devices, but not common signaling information for the other groups. (The common signaling information may precede the one or more user-specific portions of the HE SIG-B field.) For each of the subchannels of the channel, the corresponding HE SIG-B field may include both common signaling information for the corresponding group and user-specific signaling information for the corresponding group. This subchannel alignment of the signaling information implies that poor channel conditions on one or more subchannels will not compromise the downlink performance of the groups corresponding to other subchannels. Poor channel conditions on one or more subchannels may be due to OBSS interference, i.e., interference from another access point(s) simultaneously transmitting on those one or more subchannels.

Note that the HE SIG-A section may include common information for all user devices in all user groups. In contrast, each HE SIG-B field includes common information only for the corresponding group of user devices.

Each of the user devices of a given group may decode the common signaling information from the corresponding HE SIG-B field (but not decode the common signaling information from the other HE SIG-B fields). Furthermore, each user device Uk of the given group may decode at least the corresponding user specific signaling information S-Uk from the same HE SIG-B field. The user device Uk may then use the common signaling information and the user specific signaling information S-Uk to decode the corresponding traffic data T-Uk.

Figure 6:
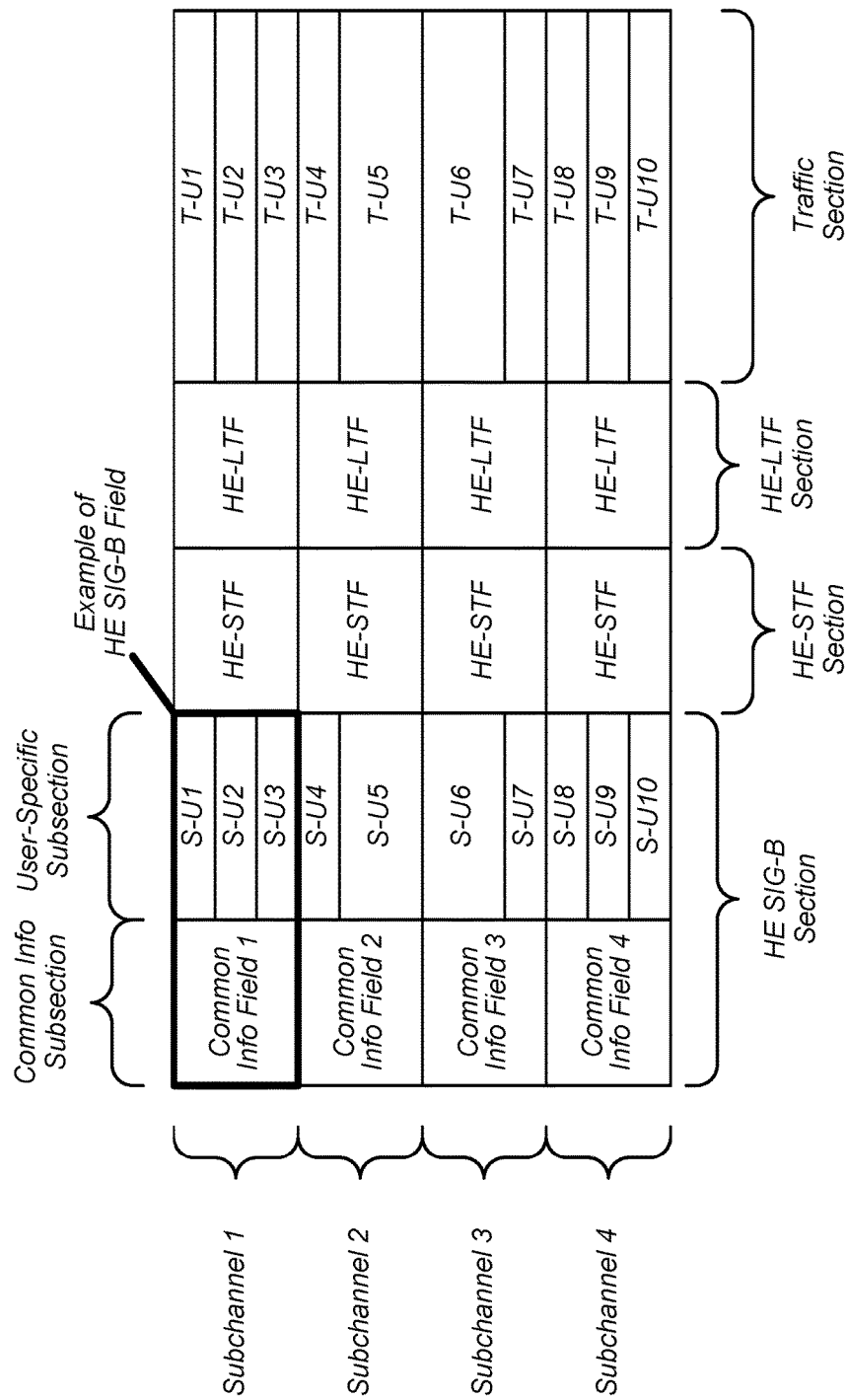
FIG. 6 illustrates an example of a protocol data unit according to some embodiments, where a signaling section (HE SIG-B) of the protocol data unit includes group-specific common information for each group of user devices.

FIG. 6 shows an example of the HE SIG-B section, according to one embodiment. The legacy preamble section and the HE SIG-A section are omitted from the protocol data unit for clarity of illustration. The HE SIG-B section includes a common information subsection and a user-specific subsection. (In other words, each HE SIG-B field may contain a corresponding common portion and a corresponding user-specific portion.)

The common information subsection includes common information fields corresponding respectively to the subchannels. The common information field k corresponding to subchannel k includes common signaling information for the $k^{th}$ group of one or more user devices. In particular:

common information field 1 includes common signaling information for the group of user devices comprising user devices U1, U2 and U3;

common information field 2 includes common signaling information for the group of user devices comprising user devices U4 and U5;

common information field 3 includes common signaling information for the group of user devices comprising user devices U6 and U7; and common information field 4 includes common signaling information for the group of user devices comprising user devices U8, U9 and U10.

The common signaling information in a given common information field may be shared among the user devices within the same subchannel. Such information might include, e.g., information assigning resource unit(s) to user devices.

The user specific subsection of the PDU may include fields corresponding respectively to the subchannels. For each subchannel, the corresponding field of the user specific subsection may include user specific signaling for the corresponding group of one or more user devices, e.g., as variously described above. For example, the user specific field corresponding to subchannel 1 may include signaling information S-U1, S-U2 and S-U3 for the user devices U1, U2 and U3, respectively.

For each subchannel, the corresponding HE SIG-B field may include common information and user specific information that apply to that subchannel and not to other subchannels. Within the HE SIG-B field, the boundary between the common information and the user specific information may occur with bit-level resolution, not necessary at an OFDM symbol boundary. For each user device assigned to the subchannel, the user specific information may include items such as STA-ID, MCS, Nsts (no. of spatial streams), STBC indication, coding scheme, beamforming information, etc. (STA-ID is a unique identifier for the STA, i.e., the user device. STBC is an acronym for space time block code.)

Flexibility of Sub-Band Operation for HE SIG-B

In the embodiments described above, the access point may transmit a protocol data unit comprising 20 MHz subchannels because such subchannels are units of legacy operation. If the access point has knowledge about the operating bandwidth of overlapping basic service sets (i.e., one or more other basic service sets than the one controlled by the present access point), the transmitter may combine two or more of the unitary subchannels (i.e., 20 MHz subchannels) to form a non-unitary subchannel. For example, in the 80 MHz channel, the access point may combine the two interior unitary subchannels to form a 40 MHz non-unitary subchannel while leaving the first and last unitary subchannels uncombined. This subchannel configuration might be symbolized with the notation [20,40,20]. As another example, the first three unitary subchannels may be combined to form a 60 MHz non-unitary subchannel, leaving the last unitary subchannel uncombined. This subchannel configuration might be symbolized by [60,20].

Figure 7:
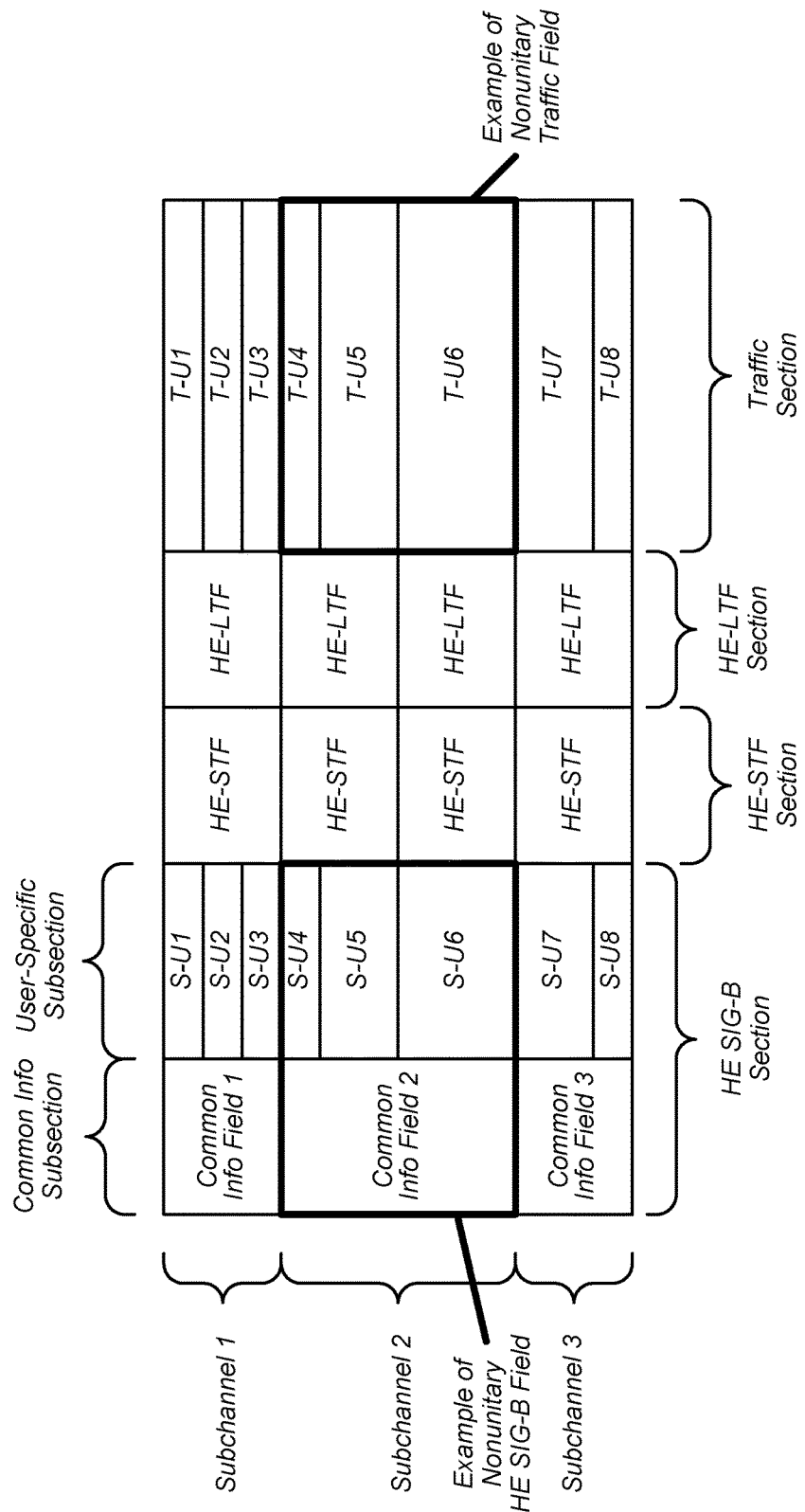
FIG. 7 illustrates an example of a protocol data unit according to some embodiments, where subchannel sizes are configurable.

FIG. 7 illustrates an example of the [20,40,20] subchannel configuration. For each subchannel, whether unitary or non-unitary, the corresponding HE SIG-B field includes corresponding common signaling information and corresponding user-specific signaling information for the corresponding group of one or more user devices. In particular, FIG. 7 shows an example where:

the HE SIG-B field corresponding to subchannel 1 (a unitary subchannel) includes common signaling information 1 and user-specific signaling information S-U1, S-U2 and S-U3 for user devices U1, U2 and U3, respectively;

the HE SIG-B field corresponding to subchannel 2 (a 40 MHz non-unitary subchannel) includes common signaling information 2 and user-specific signaling information S-U4, S-U5 and S-U6 for user devices U4, U5 and U6, respectively; and the HE SIG-B field corresponding to subchannel 3 (a unitary subchannel) includes common signaling information 3 and user-specific signaling information S-U7 and S-U8 for user devices U7 and U8, respectively.

In some embodiments, the subchannel configuration of the traffic section may be the same as the subchannel configuration of the HE SIG-B section, i.e., each traffic field in the traffic section may occupy the same interval of frequency as the corresponding HE SIG-B field, e.g., as illustrated in FIG. 7.

In some embodiments, the access point may sense the extent of interference on the unitary subchannels of the channel, i.e., interference due to transmissions by other access point(s). The access point may combine two or more contiguous unitary subchannels that are experiencing interference from other access point(s) to form a non-unitary subchannel. In other embodiments, the access point may combine two or more contiguous unitary subchannels that are free from interference, i.e., that are not being used by other access point(s) for transmission.

The Table below shows the possible subchannel configurations and the corresponding values of a 3-bit signaling index (B0,B1,B2), according to one embodiment. The access point may select one of the subchannel configurations, e.g., based on an analysis of channel conditions on the unitary subchannels of the operating channel, and insert the corresponding configuration index value in the information set of HE SIG-A. Each user device of each group may decode the configuration index to determine the subchannel configuration that has been selected.

Table of Possible Subchannel Configurations

| B0 | B1 | B2 | Subchannel Configuration |
|---|---|---|---|
| 0 | 0 | 0 | [20, 20, 20, 20]: All subchannels are unitary. |
| 0 | 0 | 1 | [40, 20, 20]: Two unitary subchannels with one 40 MHz subchannel at lower end of channel |
| 0 | 1 | 0 | [20, 40, 20]: Two unitary subchannels with one 40 MHz subchannel in middle of channel |
| 0 | 1 | 1 | [20, 20, 40]: Two unitary subchannels with one 40 MHz subchannel at upper end of channel |
| 1 | 0 | 0 | [60, 20]: One unitary subchannel with one 60 MHz subchannel at lower end of channel |
| 1 | 0 | 1 | [20, 60]: One unitary subchannel with one 60 MHz subchannel at upper end of channel |
| 1 | 1 | 0 | [80]: Single 80 MHz subchannel having width equal to channel width. |
| 1 | 1 | 1 | Reserved |

More generally, given a channel with a plurality of unitary subchannels, the access point may generate and transmit a protocol data unit where at least the HE SIG-B section conforms to a selected subchannel configuration from allowed set of subchannel configurations. Each of the subchannel configurations of the allowed set maps to a corresponding value of a subchannel configuration index. The access point may signal the selected subchannel configuration to user devices by inserting the corresponding value of the subchannel configuration index in the HE SIG-A information set.

In some embodiments, the HE SIG-A section may span two OFDM symbols, and the subcarrier spacing may be set so that the HE SIG-A information set carries 52 information bits. Among those 52 bits may be two bits for indicating to the user devices the total bandwidth for multiuser downlink operation. The above described subchannel configuration index may be added to the HE SIG-A information set, e.g., before or after the 2-bit total bandwidth indication.

In alternative embodiments, the HE SIG-A section may span three, four or more OFDM symbols.

Coding Sequence for the HE SIG-B Section

Figure 8:
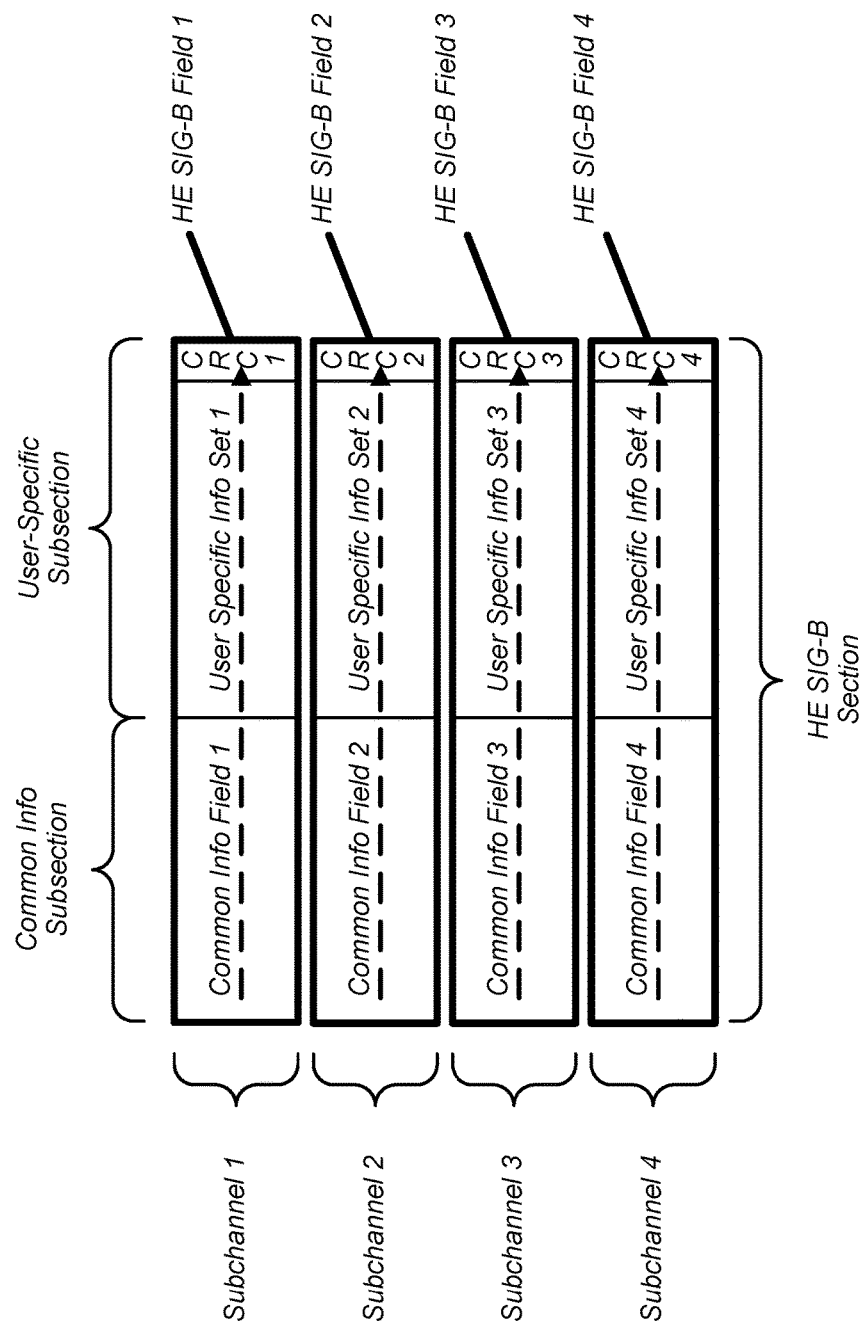
FIG. 8 illustrates an example of the HE SIG-B signaling section according to some embodiments, where each subchannel portion of the HE SIG-B signaling section is concluded with a corresponding Cyclic Redundancy Check (CRC) value, and is encoded in parallel with the other subchannel portions.

In some embodiments, the access point may encode the information in the HE SIG-B section in parallel fashion, e.g., as shown in FIG. 8. Four encoders operating in parallel may respectively encode the four HE SIG-B fields of the HE SIG-B section. (The dashed arrows are meant to suggest the parallel operation.) Each of the HE SIG-B fields may include a corresponding common information field and a corresponding user-specific information set, e.g., as variously described above.

A first of the encoders may encode a first bit sequence comprising: a concatenation of the common information field 1 and the user specific information set 1; and a CRC value (denoted CRC1) for said concatenation. More generally, a $k^{th}$ one of the encoders may encode a $k^{th}$ bit sequence comprising: a concatenation of the common information field k and the user specific information set k; and a CRC value (denoted CRCk) for said concatenation of the common information field k and the user specific information set k. (In some embodiments, the CRC value may be 1 to 4 bits in length.) Furthermore, a number of tail bits may be appended to the $k^{th}$ bit sequence, in order to reset the encoder to a predefined state. In some embodiments, the number of tail bits is 6. However, other embodiments 4, 5, 7, 8 or some other number of tail bits may be used.

A given user device may employ a single decoder and decode only the HE SIG-B field of the subchannel to which the user device has been assigned. (The user device may ignore the other HE SIG-B fields.) If the user device has been assigned to subchannel k, the user device may decode only HE SIG-B field k, and then check the decoded bits using the decoded version of CRCk. The user device may tune the reception band of its receiver to equal the band of subchannel k, at least for the time duration of the HE SIG-B field k.

Figure 9:
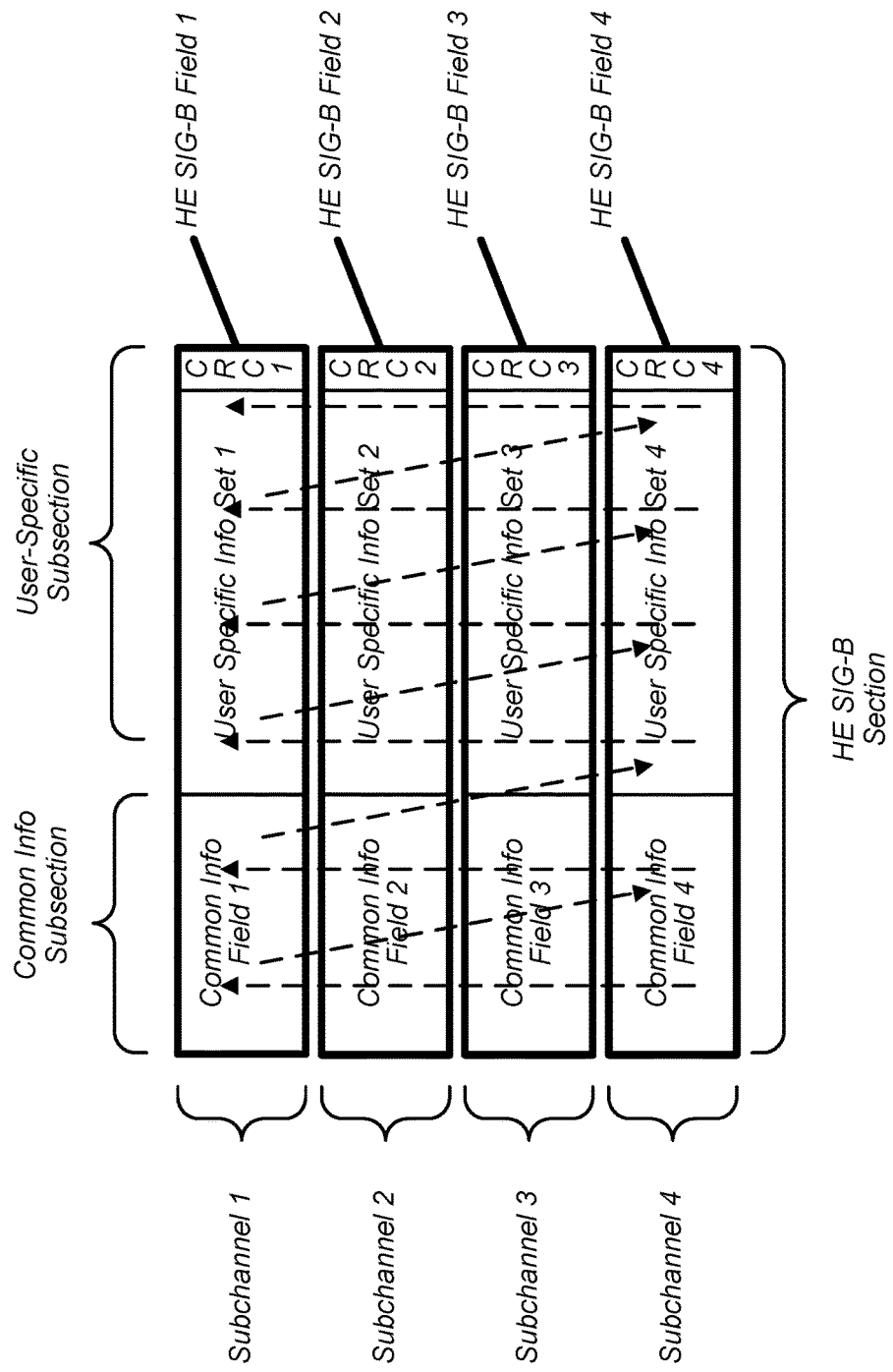
FIG. 9 illustrates an example of the HE SIG-B signaling section according to some embodiments, where each subchannel portion of the HE SIG-B signaling section is concluded with a corresponding Cyclic Redundancy Check (CRC) value, and where the HE SIG-B signaling section is encoded in a sequential order that traverses subchannels as an inner loop and proceeds in time as an outer loop.

In some embodiments, the access point may encode the information in the HE SIG-B section in a sequential fashion, e.g., as shown in FIG. 9. A single encoder of the access point may sequentially encode the information in the HE SIG-B section according to an order defined by an inner processing loop that traverses across subchannels and an outer loop that proceeds forward in time. The encoding order is suggested by the dashed arrows in FIG. 9. Prior to encoding, a CRC is appended to (or injected in) each HE SIG-B field, i.e., a CRC calculated based on the information in that HE SIG-B field. (As with the above described parallel encoding embodiments, this feature of including a CRC in each HE SIG-B field allows each HE SIG-B field to be checked independently of the other HE SIG-B fields.)

In a first of the sequential embodiments, the single encoder may maintain separate state information for each HE SIG-B field, and thus, behave as if it were four separate encoders operating respectively on the four HE SIG-B fields. In this embodiment, a user device may set the reception band of its receiver to capture only the assigned subchannel, and decode only the corresponding HE SIG-B field.

In a second of the sequential embodiments, the entire contents of the HE SIG-B section is encoded without changing state for different HE SIG-B fields (or different subchannels). Thus, a user device may set the reception band of its receiver to capture the entire channel, and sequentially decode the entire contents of the HE SIG-B section according to the above described order. From the resultant decoded HE SIG-B section, the user device may extract the decoded data corresponding to the assigned HE SIG-B field. This extracted data may be checked using the corresponding CRC. (Each HE SIG-B field preferably has a separate CRC.)

Common Information Duplicated Across Subchannels in HE SIG-B Section

Figure 10:
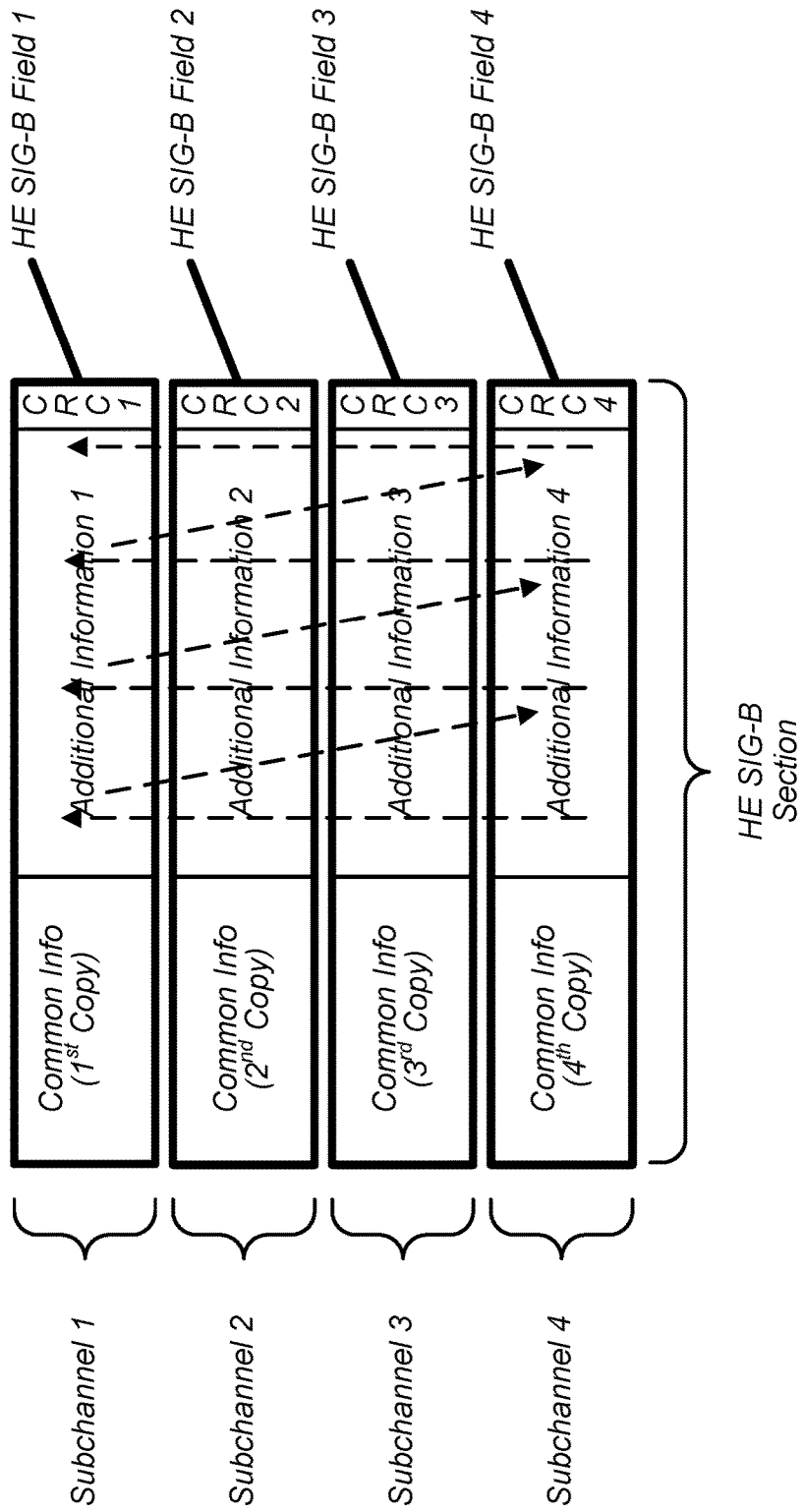
FIG. 10 illustrates an example of the HE SIG-B signaling section according to some embodiments, where each subchannel portion of the HE SIG-B signaling section includes a corresponding redundant copy of common signaling information for user devices associated with the access point.

In some embodiments, the common information to be transmitted to all users (including all users of all the subchannel-specific groups) may be larger than the bit capacity of HE SIG-A. Thus, it may be desirable to transmit one or more common information bits in the HE SIG-B section. A copy of these common information bits may be included at the beginning of each HE SIG-B field, e.g., as shown in FIG. 10. The repeated copies of the common information allows a user device to experience an effective gain in signal-to-ratio by combining (e.g., adding) the multiple copies of the common information prior to decoding the common information. Each HE SIG-B field may also include additional information (e.g., user-specific signaling information, and perhaps also groupwise common signaling information, as variously described above). The access point may encode the additional information sets 1, 2, 3, 4 in a parallel fashion or a sequential fashion, e.g., as variously described above. FIG. 10 suggests a sequential encoding (at the access point) and decoding (at a user device) of the additional information. A CRC may be included at the end of each HE SIG-B field.

The number of the common information bits in the HE SIG-B field may be signaled by an indicator included in the HE SIG-A information set. Alternatively, the number of common information bits may be fixed. In some embodiments, the number of common information bits may be in the range from 5 to 26. In some embodiments, the number of common information bits may be less than the number of bits that will fit within one OFDM symbol.

Embodiments of an Access Point

Figure 11A:
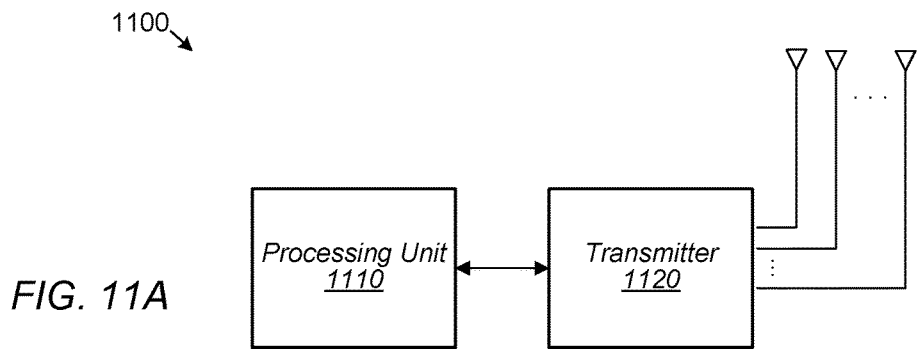
FIG. 11A illustrates an example of an access point according to some embodiments, where the access point is configured for communication with a plurality of user groups over a respective plurality of subchannels.

In one set of embodiments, an access point 1100 may be configured as shown in FIG. 11A. The access point 1100 may include a processing unit 1110 and a transmitter 1120. (The access point 1100 may also include any subset of the features, elements and embodiments described above in connection with FIGS. 1-10.) The access point may be configured for downlink multiuser transmission, e.g., using OFDMA and/or spatial multiplexing.

The processing unit 1110 may be realized by one or more processors configured to execute stored program instructions, by one or more programmable hardware elements such as FPGAs, by dedicated digital circuitry such as one or more ASICs, or any combination of the foregoing.

The transmitter 1120 may include circuitry for converting digital baseband signal(s) to analog RF signal(s). The analog RF signal(s) may be transmitted into space via a set of one or more antennas.

Figure 11B:
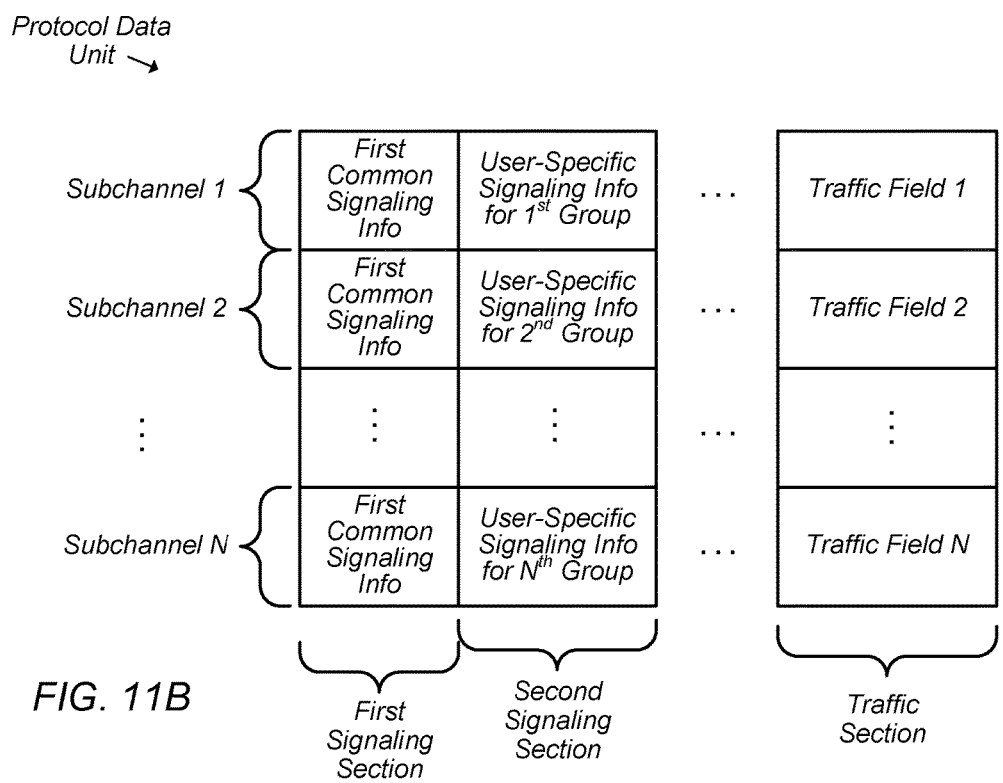
FIG. 11B illustrates an example of a protocol data unit to be transmitted by the access point of FIG. 11A, according to some embodiments.

The processing unit 1110 may be coupled to the transmitter. (The processing unit 1110 may also be coupled to a receiver, e.g., as variously described above.) The processing unit may be configured to generate a wireless protocol data unit (PDU), and transmit the wireless PDU via the transmitter 1120. The wireless PDU may span a channel in frequency and an interval IPDU in time. The wireless PDU may include a first signaling section, a second signaling section and a traffic section, e.g., as shown in FIG. 11B, or as variously described above. Each section may include one or more OFDM symbols. Each OFDM symbol may span the channel and occupy a corresponding OFDM symbol interval in time. The channel may be divided into a plurality of frequency subcarriers, e.g., depending on a subcarrier spacing parameter. An OFDM symbol comprises a sequence of subcarrier symbols corresponding respectively to the subcarriers. (In the context of OFDMA, different subsets of the subcarriers may be assigned to different user devices.) The OFDM symbol may be converted into a sequence of time domain samples by applying an Inverse Discrete Fourier Transform (e.g., IFFT) to the plurality of subcarrier symbols. The sequence of time domain samples may be converted into an analog baseband signal using a Digital-to-Analog Converter (DAC). (In some embodiments, the analog baseband signal may be a complex-valued signal comprising an inphase signal and a quadrature signal: $BBS(t)=I(t)+jQ(t)$. The DAC may be two-channel DAC, to support parallel conversion of the inphase and quadrature components.)

A stream of data to be transmitted to a given user device may be encoded to obtain an encoded bit sequence. The encoded bit sequence may be mapped to a sequence of modulation symbols using a constellation of complex points. (The code used for encoding and the constellation used for mapping may be determined by a selected modulation-and-coding scheme MCS.) The sequence of modulation symbols may be injected into selected subcarrier locations within one or more OFDM symbols.

A plurality of data streams targeted respectively for a plurality of user devices may be similarly processed. The modulation symbols for different users may be injected into different regions with a protocol data unit, e.g., depending on the scheduling decisions made by the access point's scheduling algorithm.

Referring again to FIG. 11B, for each of a plurality of subchannels of the channel, the first signaling section may include within that subchannel a redundant copy of first common signaling information for N user devices. (See, e.g., the HE SIG-A section of FIG. 4.) The N user devices may be the user devices that are associated with (or registered with) the access point.

For each of the plurality of subchannels of the channel, the second signaling section may include within that subchannel a corresponding set of user-specific signaling information for a corresponding group of one or more of the N user devices. (See, e.g., the HE SIG-B section of FIGS. 4-11.)

User devices may be assigned to subchannels, and thus, to the corresponding groups, based on an analysis of the estimated throughput (or estimated value of some other communication quality parameter) of the user devices for the subchannels. The scheduling algorithm of the access point may take into account factors such as:

a given user device may experience better throughput on one subchannel than another user device;

one user device may experience better throughput on a given channel than another user device;

a user device may have been recently served while another user device may still be waiting for an allocation;

a given user device may be assigned a higher quality of service level than other user device.

Figure 11C:
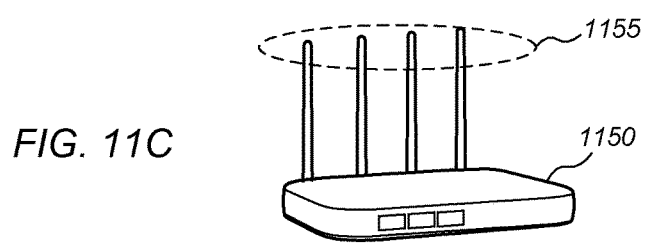
FIG. 11C illustrates an example of an access point, according to some embodiments, wherein the access point includes a plurality of antennas to support downlink spatial multiplexing.

The access point may also include an antenna subsystem. The antenna subsystem includes one or more antennas, which are used to transmit the transmitter-generated RF signal(s) into space. For embodiments that support spatial multiplexing, the antenna subsystem would include a plurality of antennas. (FIG. 11C shows one example of an access point 1150 including antennas 1155.) In some embodiments, the antenna subsystem may include 2, 4, 8 or 16 antennas. In other embodiments, the antenna subsystem may include 2, 3, 4, 5, 6, 7, 8, 9, 10, 11, 12, or some other number of antennas. In some embodiments, the antennas of the antenna subsystem serve as both transmit and receive antennas.

In some embodiments, for a given one of the subchannels, the corresponding set of user-specific signaling information includes user-specific signaling information for each of the user devices in the corresponding group.

In some embodiments, for a given one of the subchannels, the corresponding group includes two or more of the N user devices.

In some embodiments, for a given one of the subchannels, the second signaling section also includes within the given subchannel a corresponding set of group-specific common signaling information for the corresponding group. The set of group-specific common signaling information may include resource allocation information for the one or more user devices of the corresponding group.

In some embodiments, for each of the plurality of subchannels of the channel, the traffic section includes within that subchannel a corresponding traffic field that includes downlink user data for the one or more user devices of the corresponding group. The above mentioned resource allocation information for the corresponding group may identify the resource locations of the downlink user data for each of the one or more user device of the group.

In some embodiments, for each of the plurality of subchannels of the channel, the corresponding set of user-specific signaling information in the second signaling section includes one or more of the following:
- a modulation-and-coding scheme (MCS) indicator for each of the user devices of the corresponding group;
- a number of spatial streams allocated to each of the user devices of the corresponding group.

See the various discussions above for other possible signaling elements of the set of user-specific signaling information.

In some embodiments, wherein the first common signaling information includes an indication of the bandwidths of the subchannels, e.g., as variously described above. The subchannels may have bandwidths that are positive integer multiples of a unitary sub channel bandwidth.

In some embodiments, for each of the plurality of subchannels of the channel, the corresponding set of user-specific signaling information includes a corresponding Cyclic Redundancy Check (CRC) value. As previously noted, the inclusion of a CRC value in each set of user-specific signaling information allows that set to be checked independently of the other sets of user-specific signaling information. The access point may encode the second signaling section in a subchannel parallel fashion or in a sequential fashion.

In some embodiments, for each of the plurality of subchannels of the channel, the second signaling section may also include within that subchannel a redundant copy of second common signaling information for the N users. These embodiments may be especially useful in situations where the amount of common signaling information to be transmitted exceeds the bit capacity of the first signaling section.

Embodiments of a User Device

Figure 12:
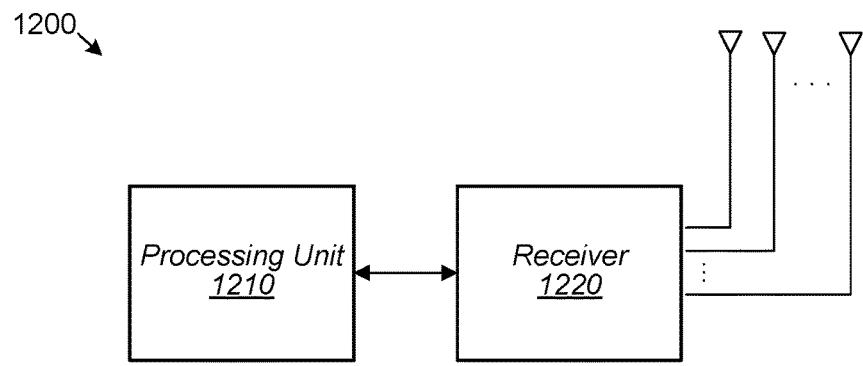
FIG. 12 illustrates an example of a user device according to some embodiments, wherein the user device may be configured to receive a protocol data unit from the access point of FIG. 11A or the access point of FIG. 11C or any of the access points described herein.

In one set of embodiments, a user device 1200 may be configured as shown in FIG. 12. The user device 1200 may include a processing unit 1210 and a receiver 1220. (The user device 1200 may also include any subset of the features, elements and embodiments described above in connection with FIGS. 1-11.) The user device may be configured to receive transmissions from an access point that supports downlink multiuser operation.

The processing unit 1210 may be realized by one or more processors configured to execute stored program instructions, by one or more programmable hardware elements such as FPGAs, by dedicated digital circuitry such as one or more ASICs, or any combination of the foregoing.

The receiver 1220 may include circuitry for receiving RF signal(s) from a set of one or more antennas, and converting the RF signal(s) to digital baseband signal(s). The one or more antennas may serve as transmit antennas as well as receive antennas. In embodiments that support spatial multiplexing, the user device 1200 includes a plurality of antennas.

The processing unit 1210 may be coupled to the receiver, and configured to receive, via the receiver, at least a portion of a wireless protocol data unit (PDU). The wireless PDU may span a channel in frequency and an interval in time. The wireless PDU may include a first signaling section, a second signaling section and a traffic section, e.g., as illustrated in FIG. 11B, or as variously described above. Each section may include one or more OFDM symbols. Each OFDM symbol may span the channel (or a selected subchannel of the channel, or a selected set of one or more subchannels) and occupy a corresponding OFDM symbol interval in time. The OFDM symbols may be converted from the time domain to the frequency domain using a Discrete Fourier Transform (e.g., an FFT).

For each of a plurality of subchannels of the channel, the first signaling section may include within that subchannel a redundant copy of first common signaling information. (For example, see the discussions above of the HE SIG-A section.) The first common signaling information may be signaling information that is commonly applicable for N user devices, e.g., the collection of user devices associated with the access point.

For each of the plurality of subchannels of the channel, the second signaling section may include within that subchannel a corresponding set of user-specific signaling information for a corresponding group of one or more of the N user devices. (For example, see the discussions above of the HE SIG-B section.) The user device 1200 may be included in a particular one of the groups, corresponding to a particular one of the sub channels.

In some embodiments, the user device 1200 may also include a transmitter coupled to the processing unit and the one or more antennas. The transmitter may be used for transmitting uplink data and/or for feedback of channel state information.

In some embodiments, the set of user-specific signaling information corresponding to the particular subchannel may include user-specific signaling information for each of the one or more user devices in the particular group. The above mentioned action of receiving at least a portion of the wireless protocol data unit (PDU) may include decoding from the particular subchannel the user-specific signaling information corresponding to the user device 1200.

In some embodiments, within the particular subchannel, the second signaling section may also include a set of group-specific common signaling information for the particular group. The set of group-specific common signaling information may include resource allocation information for the one or more user devices of the particular group. (For each of the user devices of the particular group, the resource allocation information may identify resource units in the traffic field that are allocated to that user device.) The user device 1200 may decode at least the resource allocation information that is relevant for it.

In some embodiments, within the particular subchannel, the traffic section may include a traffic field that includes downlink user data for the one or more user devices of the particular group. The user device may access downlink user data from a relevant portion of the traffic field. (The relevant portion may be identified by the resource allocation information.) The user device may decode the downlink user data to recover information bits.

In some embodiments, the set of user-specific signaling information corresponding to the particular subchannel may include one or more of the following: a modulation-and-coding scheme (MCS) indicator for the user device 1200; and a number of spatial streams allocated to the user device 1200.

In some embodiments, the first common signaling information may include an indication of bandwidths of the subchannels, e.g., as variously described above.

In some embodiments, for each of the plurality of subchannels of the channel, the corresponding set of user-specific signaling information may include a corresponding Cyclic Redundancy Check (CRC) value.

In some embodiments, for each of the plurality of subchannels of the channel, the second signaling section also includes within that subchannel a redundant copy of second common signaling information for the N users.

In some embodiments, the processing unit 1210 may be configured so that, at least during a time interval corresponding to the second signaling section, a reception band of the receiver 1220 is set to capture the first subchannel, but not other subchannels of said plurality of subchannels.

In some embodiments, the processing unit 1210 may be configured so that, at least during a time interval corresponding to the first signaling section, the reception band of the receiver 1220 is set to capture the channel.

In some embodiments, an access point comprises: a transmitter; and a processing unit coupled to the transmitter. The processing unit is configured to generate a wireless protocol data unit (PDU), and transmit, via the transmitter, the wireless PDU. The wireless PDU spans a channel in frequency and an interval in time. The wireless PDU includes a first signaling section, a second signaling section and a traffic section. For each of a plurality of subchannels of the channel, the first signaling section includes within that subchannel a redundant copy of first common signaling information for N user devices. For each of the plurality of subchannels of the channel, the second signaling section includes within that subchannel a corresponding set of signaling information for a corresponding group of one or more of the N user devices.

In some embodiments, for a first of the subchannels, the corresponding set of signaling information includes user-specific signaling information for each of the user devices in the corresponding group.

In some embodiments, for a first of the subchannels, the corresponding group includes two or more of the N user devices.

In some embodiments, for a first of the subchannels, the second signaling section also includes within the first sub-channel a corresponding set of group-specific common signaling information for the corresponding group, wherein the set of group-specific common signaling information includes resource allocation information for the one or more user devices of the corresponding group.

In some embodiments, for each of the plurality of sub-channels of the channel, the traffic section includes within that subchannel a corresponding traffic field that includes downlink user data for the one or more user devices of the corresponding group.

In some embodiments, for each of the plurality of sub-channels of the channel, the corresponding set of signaling information in the second signaling section includes one or more of the following: a modulation-and-coding scheme (MCS) indicator for each of the user devices of the corresponding group; a number of spatial streams allocated to each of the user devices of the corresponding group.

In some embodiments, the first common signaling information includes an indication of bandwidths of the sub channels.

In some embodiments, for each of the plurality of sub-channels of the channel, the corresponding set of signaling information includes a corresponding Cyclic Redundancy Check (CRC) value.

In some embodiments, for each of the plurality of sub-channels of the channel, the second signaling section also includes within that subchannel a redundant copy of second common signaling information for the N users.

In some embodiments, a user device may comprises: a receiver; and a processing unit coupled to the receiver. The processing unit is configured to receive, via the receiver, at least a portion of a wireless protocol data unit (PDU), wherein the wireless PDU spans a channel in frequency and an interval in time, wherein the wireless PDU includes a first signaling section, a second signaling section and a traffic section. For each of a plurality of subchannels of the channel, the first signaling section includes within that subchannel a redundant copy of first common signaling information for N user devices. For each of the plurality of subchannels of the channel, the second signaling section includes within that subchannel a corresponding set of signaling information for a corresponding group of one or more of the N user devices, wherein said user device is included in a first of the groups, corresponding to a first of the sub channels.

In some embodiments, the set of signaling information corresponding to the first subchannel includes user-specific signaling information for each of the one or more user devices in the first group, wherein said receiving includes decoding from the first subchannel the user-specific signaling information corresponding to said user device.

In some embodiments, within the first subchannel, the second signaling section also includes a first set of group-specific common signaling information for the first group, wherein the first set of group-specific common signaling information includes resource allocation information for the one or more user devices of the first group.

In some embodiments, within the first subchannel, the traffic section includes a first traffic field that includes downlink user data for the one or more user devices of the first group.

In some embodiments, the set of signaling information corresponding to the first subchannel includes one or more of the following: a modulation-and-coding scheme (MCS) indicator for said user device; and a number of spatial streams allocated to said user device.

In some embodiments, the first common signaling information includes an indication of bandwidths of the sub channels.

In some embodiments, for each of the plurality of sub-channels of the channel, the corresponding set of signaling information includes a corresponding Cyclic Redundancy Check (CRC) value.

In some embodiments, for each of the plurality of sub-channels of the channel, the second signaling section also includes within that subchannel a redundant copy of second common signaling information for the N users.

In some embodiments, the processing unit is configured so that, at least during a time interval corresponding to the second signaling section, a reception band of the receiver is set to capture the first subchannel but not other subchannels of said plurality of subchannels.

In some embodiments, the processing unit is configured so that, at least during a time interval corresponding to the first signaling section, the reception band of the receiver is set to capture the channel.

Further Embodiments

In some embodiments, an access point may comprise: an antenna configured to perform wireless communications according to a Wi-Fi protocol; and a processing element coupled to the antenna. The access point may be configured to transmit, via the antenna, a wireless downlink transmission to a plurality N of mobile stations over two or more sub-channels, wherein for each sub-channel the wireless transmission comprises a preamble portion and a user data portion. For at least one first sub-channel the user data portion may comprise a first bandwidth portion allocated to a plurality M of mobile stations, wherein M<N. For the at least one first sub-channel the preamble portion may comprise a first signaling field comprising information that is common to each of the plurality N of mobile stations; and a second signaling field. The second signaling field may be specific to the first bandwidth portion and the plurality M of mobile stations. The second signaling field may comprise a first portion that is common to the plurality M of mobile stations, and a plurality M of second portions, wherein each of the plurality M of second portions is specific to a respective one of the plurality M of mobile stations.

The access point may be further configured so that each of the plurality M of second portions of the second signaling field comprises information regarding a number of streams, beamforming information, and information regarding a modulation and coding scheme for its respective mobile station.

The access point may be further configured so that the first portion of the second signaling field comprises channel mapping information for the plurality M of mobile stations.

The access point may be further configured so that the first signaling field is duplicated for each of the two or more sub-channels; wherein the second signaling field is specific to each respective sub-channel.

The access point may be further configured so that the Wi-Fi protocol is 802.11 ax.

The access point may be further configured so that the first signaling field is a SIG A field and the second signaling field is a SIG B field.

In some embodiments, a mobile station may comprise: an antenna configured to perform wireless communications according to a Wi-Fi protocol; and a processing element coupled to the antenna. The mobile station may be configured to receive, via the antenna, a wireless downlink transmission from a base station on a first sub-channel. The wireless downlink transmission may comprise a preamble portion and a user data portion. The user data portion may comprise a first bandwidth portion allocated to a plurality M of mobile stations. The preamble portion may comprise: a first signaling field comprising information that is common to each of a plurality N of mobile stations, wherein N>M; and a second signaling field. The second signaling field may be specific to the first bandwidth portion and the plurality M of mobile stations. The second signaling field may comprise a first portion that is common to the plurality M of mobile stations and a plurality M of second portions. Each of the plurality M of second portions may be specific to a respective one of the plurality M of mobile stations.

Examples have been provided in which an 80 MHz channel is divided into four 20 MHz subchannels. However, the concepts disclosed herein can be applied to any channel bandwidth and any number of subchannels.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, an integrated circuit (or a set of interconnected integrated circuits), e.g., a digital integrated circuit or a mixed analog-and-digital integrated circuit, may be configured to perform any of the various method embodiments described herein (or, any combination of the method embodiments described herein, or, any subset of any of the method embodiments described herein, or, any combination of such subsets).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An access point comprising:
a transmitter; and
a processing unit coupled to the transmitter, wherein the processing unit is configured to:
generate a wireless protocol data unit (PDU),
wherein the wireless PDU spans a channel in frequency,
wherein the channel comprises a plurality of subchannels, and respective subchannels of the plurality of subchannels span respective portions of the frequency of the channel,
wherein the wireless PDU includes a first signaling section, a second signaling section, and a traffic section, the first signaling section spanning the channel in frequency and a first time interval, and the second signaling section spanning the channel in frequency and a second time interval,
wherein the first signaling section includes a plurality of redundant copies of first common signaling information for two or more user devices of N user devices, wherein respective subchannels of the plurality of subchannels comprise respective redundant copies of the plurality of redundant copies within the respective portions of the frequency and the first time interval, wherein the first signaling section comprises an HE-SIG-A and a first field of an HE-SIG-B, wherein the HE-SIG-A comprises a first portion of the first common signaling information, wherein the first field of an HE-SIG-B comprises a second portion of the first common signaling information,
wherein, for each of the plurality of subchannels of the channel, the second signaling section includes within that subchannel a corresponding set of signaling information for a corresponding group of one or more of the N user devices, wherein the second signaling section comprises a second field of the HE-SIG-B; and transmit, via the transmitter, the wireless PDU.

2. The access point of claim 1, wherein, for a first of the subchannels, the corresponding set of signaling information includes user-specific signaling information for each of the user devices in the corresponding group.

3. The access point of claim 1, wherein, for a first of the subchannels, the corresponding group includes two or more of the N user devices.

4. The access point of claim 1, wherein, for a first of the subchannels, the second signaling section also includes within the first subchannel a corresponding set of group-specific common signaling information for the corresponding group, wherein the set of group-specific common signaling information includes resource allocation information for the one or more user devices of the corresponding group.

5. The access point of claim 4, wherein, for each of the plurality of subchannels of the channel, the traffic section includes within that subchannel a corresponding traffic field that includes downlink user data for the one or more user devices of the corresponding group.

6. The access point of claim 4, wherein, for each of the plurality of subchannels of the channel, the corresponding set of signaling information in the second signaling section includes one or more of the following:
a modulation-and-coding scheme (MCS) indicator for each of the user devices of the corresponding group;
a number of spatial streams allocated to each of the user devices of the corresponding group.

7. The access point of claim 1, wherein the first common signaling information includes an indication of bandwidths of the subchannels.

8. The access point of claim 1, wherein, for each of the plurality of subchannels of the channel, the corresponding set of signaling information includes a corresponding Cyclic Redundancy Check (CRC) value.

9. The access point of claim 1, wherein, for each of the plurality of subchannels of the channel, the second signaling section also includes within that subchannel a redundant copy of second common signaling information for the N users.

10. A user device comprising:
a receiver; and
a processing unit coupled to the receiver, wherein the processing unit is configured to:
receive, via the receiver, at least a portion of a wireless protocol data unit (PDU), wherein the wireless PDU spans a channel in frequency, wherein the wireless PDU includes a first signaling section, a second signaling section and a traffic section, the first signaling section spanning the channel in frequency and a first time interval, and the second signaling section spanning the channel in frequency and a second time interval,
wherein the first signaling section includes a plurality of redundant copies of first common signaling information for two or more user devices of N user devices, wherein respective subchannels of the plurality of subchannels comprise respective redundant copies of the plurality of redundant copies within the respective portions of the frequency and the first time interval, wherein the first signaling section comprises an HE-SIG-A and a first field of an HE-SIG-B, wherein the HE-SIG-A comprises a first portion of the first common signaling information, wherein the first field of an HE-SIG-B comprises a second portion of the first common signaling information,
wherein, for each of the plurality of subchannels of the channel, the second signaling section includes within that subchannel a corresponding set of signaling information for a corresponding group of one or more of the N user devices, wherein said user device is included in a first of the groups, corresponding to a first of the subchannels, wherein the second signaling section comprises a second field of the HE-SIG-B.

11. The user device of claim 10, wherein the set of signaling information corresponding to the first subchannel includes user-specific signaling information for each of the one or more user devices in the first group, wherein said receiving includes decoding from the first subchannel the user-specific signaling information corresponding to said user device.

12. The user device of claim 10, wherein, within the first subchannel, the second signaling section also includes a first set of group-specific common signaling information for the first group, wherein the first set of group-specific common signaling information includes resource allocation information for the one or more user devices of the first group.

13. The user device of claim 12, wherein, within the first subchannel, the traffic section includes a first traffic field that includes downlink user data for the one or more user devices of the first group.

14. The user device of claim 12, wherein the set of signaling information corresponding to the first subchannel includes one or more of the following:
a modulation-and-coding scheme (MCS) indicator for said user device;
a number of spatial streams allocated to said user device.

15. The user device of claim 10, wherein the first common signaling information includes an indication of bandwidths of the subchannels.

16. The user device of claim 10, wherein, for each of the plurality of subchannels of the channel, the corresponding set of signaling information includes a corresponding Cyclic Redundancy Check (CRC) value.

17. The user device of claim 10, wherein, for each of the plurality of subchannels of the channel, the second signaling section also includes within that subchannel a redundant copy of second common signaling information for the N users.

18. The user device of claim 10, wherein the processing unit is configured so that, at least during a time interval corresponding to the second signaling section, a reception band of the receiver is set to capture the first subchannel but not other subchannels of said plurality of subchannels.

19. The user device of claim 18, wherein the processing unit is configured so that, at least during a time interval corresponding to the first signaling section, the reception band of the receiver is set to capture the channel.

20. A non-transitory memory medium for operating a user device, the memory medium storing program instructions, wherein the program instructions, when executed by a processor, cause the processor to implement:
receiving at least a portion of a wireless protocol data unit (PDU), wherein the wireless PDU spans a channel in frequency, wherein the channel comprises a plurality of subchannels, and respective subchannels of the plurality of subchannels span respective portions of the frequency of the channel,
wherein the wireless PDU includes a first signaling section, a second signaling section and a traffic section, the first signaling section spanning the channel in frequency and a first time interval, and the second signaling section spanning the channel in frequency and a second time interval, wherein the first signaling section includes a plurality of redundant copies of first common signaling information for two or more user devices of N user devices, wherein respective subchannels of the plurality of subchannels comprise respective redundant copies of the plurality of redundant copies within the respective portions of the frequency and the first time interval, wherein the first signaling section comprises an HE-SIG-A and a first field of an HE-SIG-B, wherein the HE-SIG-A comprises a first portion of the first common signaling information, wherein the first field of an HE-SIG-B comprises a second portion of the first common signaling information, wherein, for each of the plurality of subchannels of the channel, the second signaling section includes within that subchannel a corresponding set of signaling information for a corresponding group of one or more of the N user devices, wherein said user device is included in a first of the groups, corresponding to a first of the subchannels, wherein the second signaling section comprises a second field of the HE-SIG-B.

* * * * *